Figures 1, 2:
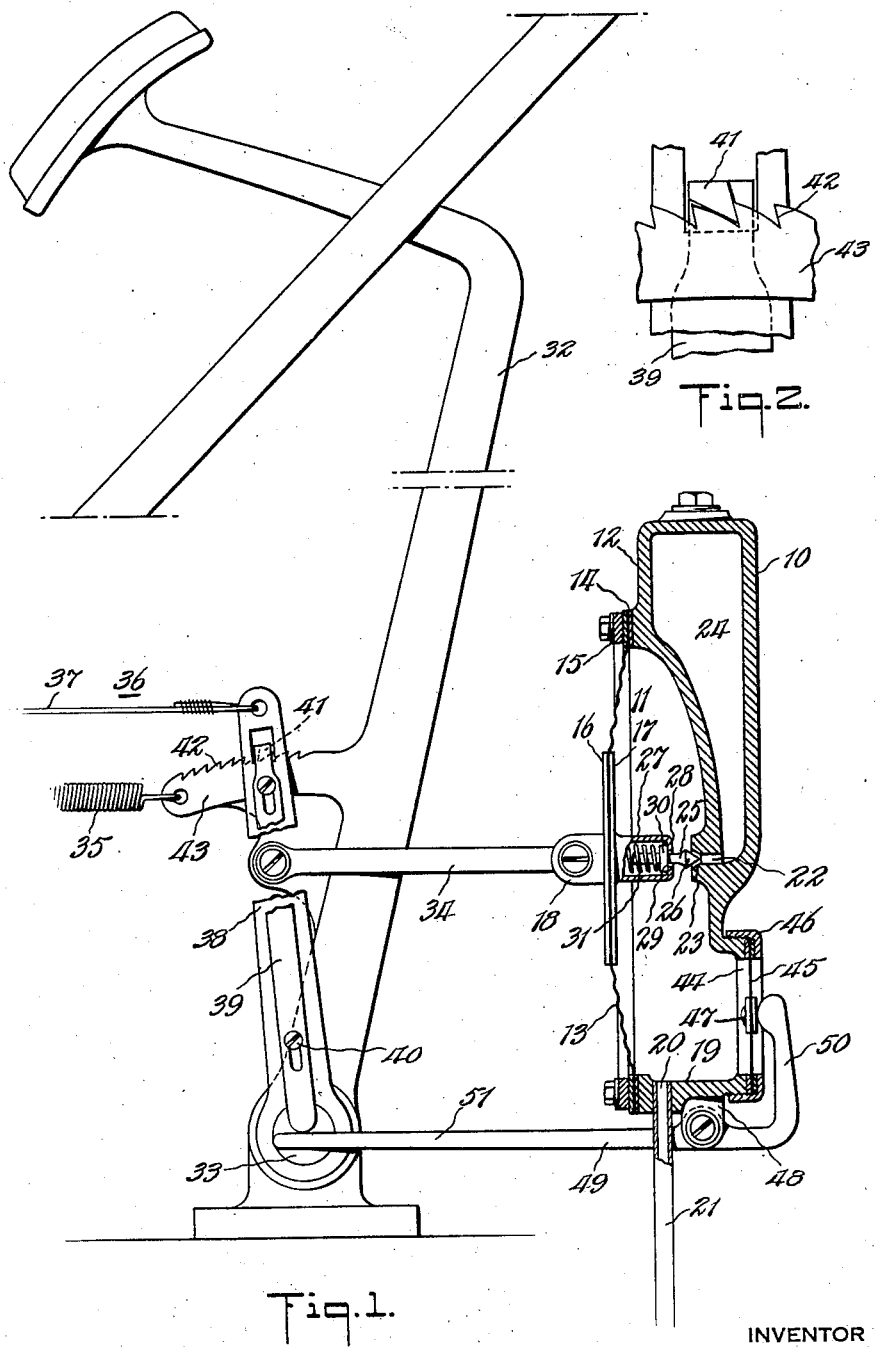

March 7, 1944.   J. F. MORAN   2,343,788
HYDROMECHANICALLY CONTROLLED MECHANISM
Filed March 7, 1941

INVENTOR
JOHN F. MORAN
BY
Orton and Griswold
ATTORNEYS

Patented Mar. 7, 1944

2,343,788

UNITED STATES PATENT OFFICE 2,343,788

HYDROMECHANICALLY CONTROLLED MECHANISM

John F. Moran, Brooklyn, N. Y.

Application March 7, 1941, Serial No. 382,212

20 Claims. (Cl. 188—106)

The invention relates in general to an improvement in hydromechanically controlled mechanism of general application where such mechanism may be employed and which are operated from a foot brake or other single source of mechanical power, normally by means of pneumatic pressure devices and which control mechanism is also operated automatically through mechanical means from said power on the failure of the pneumatic pressure devices to function.

The invention specifically relates to an improved hydromechanical brake mechanism for actuating the service brakes on an automotive vehicle from the usual foot pedal and which foot pedal will apply the brakes through an all-mechanical chain of force applying parts from the foot pedal upon a failure of pressure sufficient to cause the brakes to be applied through the usual hydraulically actuated braking mechanism.

In such devices it has been suggested heretofore that the vehicle brakes be applied from the usual foot pedal selectively through a hydraulic control and through a mechanical control with a driving interconnection therebetween which will operate automatically in the event the hydraulic braking system fails so that the brakes may be applied directly from the mechanical action of the foot lever.

Such known devices have necessitated the use of latch mechanism between the foot pedal and the mechanical brake applying mechanism and which latch mechanism has included a multiplicity of component movable parts which are quite apt to become worn and loose in service, especially when subjected to the vibration and rattle incidental to the use of such devices on automobiles and in general such complicated interlocking mechanism has not proven satisfactory in practical use.

Such known devices which move the latching mechanism between the foot brake and the mechanical mechanism by means of a plunger have the disadvantage in that the long pressure lines between the pneumatically actuated mechanism and such plungers impose a time delay in the actuation of the latch-release so that during the initial stages of the foot actuation the brakes are applied entirely by the action of the mechanical mechanism and no advantage is had from the hydraulic mechanism until first powerful foot action has already taken place and as a result the hydraulic force is relatively weak.

The invention has for a general object the providing of an improved and simplified form of control for effecting a positive, sure, quick-acting and entirely automatic transference of the manual force of the usual path provided by the pneumatically actuated mechanism to a supplemental path provided by the mechanically actuated mechanism immediately on the failure of pressure in the pneumatically actuated mechanism to an extent which would cause it to fail to function.

The invention in its interconnecting parts between the foot lever and the mechanically actuated mechanism features simplicity in construction; the minimizing in the number of operative parts and the designing of such necessary parts as simple mechanical elements not apt to become damaged in use and which can be readily replaced by new parts when damaged.

The invention also features in its pneumatically actuated mechanism the providing of a hydraulic brake system in which leakage therefrom of its contained pressure transmitting liquid may be automatically replenished during the entire period of time while the mechanism is inactive and which will thus insure the functioning of the hydraulic mechanism so long as there is sufficient actuating liquid remaining in the device.

Various other objects and advantages of the invention will be in part obvious from an inspection of the accompanying drawing and in part will be more fully set forth in the following particular description of one mechanism embodying the invention, and the invention also consists in certain new and novel features of construction and combination of parts hereinafter set forth and claimed.

In the accompanying drawing:

Fig. 1 is a schematic view showing one embodiment of the invention as applied to a conventional form of combined hydraulic and mechanical brake system of an automotive vehicle and in which drawing the compression chamber is shown in vertically transverse axial section; and Fig. 2 is a detailed view of the interconnection between the power means and the mechanical actuated mechanism as viewed from the left of Fig. 1.

In the drawing there is shown a pressure creating means including a compression casing 10 provided with an opening 11 centered in its front side 12. The opening 11 is closed by means of a main flexible wall or diaphragm 13, preferably formed of steel or phosphor bronze, mounted between compressible washers 14 and secured to the casing 10 by means of a clamping ring 15. The diaphragm is reinforced at its center by stiffening plates 16 and 17, the outer plate 16 being provided at its center with an apertured ear 18. The bottom wall 19 of the casing is provided with an outlet port 20 for placing the compression chamber in the casing in fluid communication with hydraulically actuated mechanism indicated symbolically by the brake actuating pressure line 21.

The casing 10 is provided centrally thereof with a fluid inlet supply port 22, the inner end of which port opens into the compression chamber and provides a conical valve seat 23. Pressure transmitting liquid, such as is at present used in hydraulic braking systems, is supplied to port 22 from a reservoir 24. It is understood that the reserve liquid in the reservoir 24 is not under pressure and simply flows by gravity from the reservoir into the compression casing as may be needed to fill the same. The inlet port is normally opened so that liquid is supplied automatically from the reservoir to take the place of any of the liquid which may have leaked from the system. In this way, the compression chamber and the hydraulically actuated mechanism associated therewith is supplied with liquid so long as there is a supply in the reservoir.

Fluid communication between the compression chamber in the casing 10 and the reservoir 21 is intercepted automatically on the creation of pressure in the casing so as to defeat any possibility of transmitting pressure back to the liquid remaining in the reservoir. For this purpose, there is provided an inlet control valve 25 provided at one end with a conical valve head 26 fashioned to fit on seat 23 and thus close port 22. The valve 25 is of a floating type and is supported in a cylindrical valve housing 27 secured to, preferably formed integral with, and thus movable with, the inner plate 17 at the center of the main diaphragm. The housing 27 is defined at its inner end by an inturned annular stop flange 28. The valve projects from the housing through an opening 29 formed in the center of the stop flange 28 and is located and guided by the housing in axial alignment with port 22. The valve is provided with a laterally extending stop flange 30 which in its engagement with flange 28 limits the outward extent of movement of the valve. A valve seating spring 31 is contained within the housing 27 and reacts between the diaphragm and valve in a tendency to project the valve in a direction towards the valve seat and to secure the valve in spring-pressed engagement with the seat. It is suggested as being within the scope of this disclosure to substitute a normally open flap valve for the diaphragm actuated valve herein illustrated.

Power means are provided for moving the pressure creating diaphragm 13 inwardly of the casing to create pressure therein for actuating the hydraulically actuated mechanism supplied through the outlet port 20. For this purpose, there is provided a foot brake lever 32 fulcrumed at 33 and connected to the diaphragm through a pressure transmitting link 34 pivotally connected to the ear 18 and to the lever 32. A relatively powerful retractile spring 35 acts on the foot lever to swing the same in a direction to restore the lever to its normal inoperative position and to restore the diaphragm to its normal, outwardly distended position illustrated in the drawing.

As thus far described, and assuming that the casing 10 and associated pressure line 21 is filled with the pressure transmitting liquid, it will be understood that actuating the foot brake as by moving it from left to right in the showing will swing the diaphragm 13 inwardly to create pressure in the casing and to shift the valve head 26 into position to close the inlet port 22. Should it so happen that the inward swing of the diaphragm should go beyond the position where it just seats the valve, the valve movement will, of course, be stopped as it engages its seat, but the diaphragm is free to go therebeyond under which condition the valve spring 31 will act to hold the valve on its seat and assist in cushioning the inward swing of the diaphragm.

Releasing manual pressure on the foot brake will permit retractile spring 35 to swing the foot brake lever and the diaphragm attached thereto back to the left, thus restoring the parts to their normal inoperative position illustrated.

This operation will be the normal operation of the device when functioning to apply the vehicle brakes by virtue of the hydraulically actuated mechanism connected with the port 20. The present disclosure also contemplates the applying of the brakes through mechanical mechanism in the event that there is an absence of sufficient pressure generated in the casing 10 to affect the operation of the hydraulic means.

Mechanically actuated mechanism 36 includes a mechanical brake system indicated symbolically by the brake pull rod 37 connected to brake control arm 38 pivotally mounted to turn about the fulcrum 33 so that this control arm and the brake lever have a common axis of rotation. The brake arm extends in the same general direction as the foot lever and is normally connected to move back and forth therewith as the lever is actuated by foot pressure.

This connection is provided by means of an interconnecting latch means comprising a sliding latch plate 39 guided for movement longitudinally along arm 38 by pin and slot connections 40. The upper end of the plate 39 is provided with an L-shaped detent 41 over-lapping and adapted to engage any one of a line of teeth 42 formed in the upper side of a toothed extension 43 projecting from the foot brake lever in the plane of its rocking movement.

It will be understood from this construction that actuating the foot pedal conventionally will cause whichever tooth is for the moment in rear of the detent 41 to bear on the detent and therethrough act on the brake control arm 38 to move it to the right from the position shown thus placing a pull or tension on rod 37 to apply the vehicle brakes following conventional practices in this respect.

Release means are provided for disconnecting the detent 41 from its engagement with the power means 32 in those cases where the power means are effective to create in the compression casing sufficient pressure to actuate the hydraulic mechanism. For this purpose the rear wall of the casing 10 is provided with an opening 44 closed by a secondary metallic diaphragm 45 secured in place by a clamping member 46. The diaphragm 45 is provided centrally thereof with a wear piece 47. Pivotally mounted on a lug 48 depending from the casing is an interlocking control member 49 in the form of a long unlatching lever, one end of which forms a short L-shaped arm 50, the free end of which is in bearing engagement with the wear piece 47. The other arm 51 of the lever is relatively long, extends towards the fulcrum 33 and underlaps the lower end of the latch plate 39 in position to elevate the latch plate and thus move the detent 41 into an inoperative position clear of the extension 43.

In operation and assuming that the inward movement of the main diaphragm 13 creates pressure in the casing 10, this pressure will act on the secondary diaphragm 45 to swing the same outward relative to the casing. In the form of the device illustrated, this outward movement of the diaphragm will be relatively small in extent, However, this small displacement of the wear piece at the center of the diaphragm will operate through the long arm of the lever to swing its free end upwardly for a material distance or sufficient to lift the detent 41 upwardly and away from the teeth on the extension 43. This will have the effect of disconnecting the mechanically actuated brake control mechanism from the foot brake lever whenever the hydraulic mechanism functions.

Should the hydraulic mechanism 21 fail for any reason to continue to function after the mechanical mechanism 36 has been disconnected from the power 32 as indicated, the subsequent failure of pressure in the casing sufficient to maintain the secondary diaphragm in its distended position will permit the lever 49 and the sliding latch plate 39 to fall back gravitationally into their normal positions restoring the interlock at 41 between the foot brake and the mechanical mechanism so that the brakes will continue to be applied through the all-mechanical chain of connected parts after any failure in pressure in the hydraulic mechanism.

It is a feature of this disclosure that the secondary diaphragm 45 is wide open to the hydraulic pressure in the pressure system and is thus sensitively responsive to any diminution of actuating pressure in the line so that in the event the pressure falls below that preset pressure necessary to operate the brakes, such reduction of pressure is noted at the diaphragm and the spring of the diaphragm back towards its normal position will be sufficient to restore the all-mechanical brake applying chain of brake control parts promptly on any such reduction in pressure at its generating source.

I claim:

1. The combination of hydraulically actuated mechanism, pressure creating means operatively connected to said mechanism to actuate the same, said pressure creating means including a casing outlined in part by a pressure actuated wall, power means engaging said wall for actuating said pressure means, mechanically actuated mechanism, latch means normally connecting the power means with the mechanically actuated mechanism to cause the power means, at least during its initial movement, to actuate simultaneously both the mechanically actuated mechanism and the pressure creating means, and release means including a lever carried by the casing and responsive to pressure generated in the casing during the initial movement of the power means to shift the latch means into an inoperative position and thus inactivate the normal operative connection between the power means and the mechanically actuated mechanism but to cause the power means to continue to operate the mechanically actuated mechanism on an initial or subsequent failure of the pressure creating means to function.

2. In a device of the class described, the combination of a compression casing, hydraulically actuated mechanism in fluid communication therewith and actuated thereby, said casing including two flexible diaphragms defining different parts of its outlines, power means connected to one of the diaphragms to create pressure in the casing and its associated mechanism, mechanically actuated mechanism, latch means normally connecting said last named mechanism with the power means to cause the power means to actuate the same, and release means actuated by the other diaphragm when moved outward by pressure in the casing and operatively connected to the latch means to move it into an inoperative position and thus automatically inactivate the connection between the power means and the mechanically actuated mechanism but when the power means is effective in creating sufficient pressure in the casing to cause the second diaphragm to move outwardly and thus operate the latch release means.

3. In a device of the class described, the combination of a compression casing including a flexible wall and provided with a port for connecting the casing with compression actuated mechanism, a foot lever connected to the wall to create pressure in the casing, said casing also provided with a second flexible wall distendable outwardly by pressure in the casing, mechanically actuated mechanism, power transmitting connecting means between the mechanically actuated mechanism and the foot lever and an unlatching lever having one arm bearing on said second flexible wall and its other arm engaging said connecting means to move the same into an inoperative position and thus free the foot lever from the mechanically actuated mechanism when the pressure created in the casing is sufficient to move the second flexible wall to cause the unlatching lever to function.

4. For a brake system operated by mechanical and hydraulic pressure means, means for actuating said hydraulic means including a compression casing wide open on one side, a flexible metallic diaphragm wall closing said open side and provided centrally thereof with reinforcing plates, a foot brake lever operatively connected to the plates on the diaphragm wall to create pressure in the casing and thus to cause the hydraulic pressure means to function, means including a releasable latch normally operatively connected for actuating the mechanical pressure means from said lever immediately on any actuation of the lever from its normal inactive position, and means operatively responsive to the pressure created in the casing during the initial shifting of the foot brake lever for shifting the latch into an inoperative position and thereby to inactivate the connection between the lever and the mechanical pressure means whereby the last named means becomes effective only on failure of pressure in the casing sufficient to release the latch.

5. For a vehicle having a hydraulic brake system with a brake actuating pressure line, pressure means provided with a diaphragm actuated in one direction by pressure in said line, a foot lever acting on said pressure means for creating pressure in said line, and a mechanical brake system with an arm for actuating the brakes, said arm and lever having a common axis of rotation, the combination of a latch held gravitationally in its operative position normally connecting the arm and foot lever to move in unison and thus simultaneously start the mechanical brake system in operation and to create pressure in the hydraulic brake system on the initial movement of the foot lever, and latch releasing means including a lever rocked by the movement of the diaphragm and operatively connected to the latch for lifting the same to break the normal connection between the arm and lever by virtue of the presence of pressure in the pressure line sufficient to cause the diaphragm to move.

6. In a device of the class described, the combination of a pressure creating casing provided with means for connecting the same to a pressure line, a metal diaphragm having its edges clamped in position and otherwise wide open to and thus promptly exposed on one side to the pressure in said casing and having its central portion movable outwardly thereof by the pressure therein, power means for creating pressure in said casing, mechanism actuated by said power means and including a normally operable but releasable connection between the power means and said mechanism for causing them to move in unison, and release means actuated by the outward movement of the diaphragm when moved by the pressure in said casing for moving the releasable connection into an inoperative position and thus free the power means from said mechanism.

7. For automatically operating a mechanical brake system upon failure of a hydraulic brake system, the combination with a foot brake lever, means controlled by said lever for creating pressure in the hydraulic system, an element of said mechanical system including an arm, interlocking means between said arm and lever normally connecting the same to actuate the mechanical system directly from the foot lever as soon as the foot lever is actuated to create pressure in the hydraulic system, an unlatching lever having a short arm operatively controlled by pressure in said pressure creating means acting on the short arm over a relatively short travel and having a relatively long arm for moving the interlocking means over a relatively long travel and into an inoperative position to disconnect the foot lever from the mechanical brake system in the presence of operating pressure in the hydraulic brake system.

8. In a device of the class described, the combination of a pressure creating device, hydraulically actuated mechanism operated by pressure created in said device, a fluid reservoir for supplying said device, a valve for controlling the flow from the reservoir to said device and for intercepting any reverse flow from the device back into the reservoir, a foot brake lever connected to the device to create pressure therein, mechanically actuated mechanism operatively connected to the foot lever to be actuated thereby and including a releasable power transmitting connection, and a release means operatively controlled by the pressure created in said device for inactivating the power transmitting connection between the foot lever and the mechanically actuated mechanism just so long as there is present in the device pressure sufficient to hold the release means in its inactivating position.

9. In a device of the class described, the combination of a pressure creating casing provided on one side with a main diaphragm and on the side opposite to the diaphragm with an inlet port for supplying pressure transmitting fluid to the casing, and said casing also provided with a secondary diaphragm, a valve carried by the main diaphragm for controlling said inlet port and acting to close the port while applying pressure to the fluid in the casing, power means acting on the main diaphragm to create pressure in the casing, mechanically actuated mechanism operatively connected to be actuated by said power means at the beginning of its pressure creating movement, and release mechanism operatively controlled by the movement of the secondary diaphragm when acted upon by pressure created in said casing to cause said first named mechanism to cease functioning.

10. In a device of the class described, the combination of a casing having a port adapted to provide fluid communication with hydraulically actuated mechanism, and having an outlining wall formed in part of a flexible diaphragm, power means acting on the diaphragm to move it inwardly and thus create pressure in the casing a retractile spring acting on said power means and at all times tending to move the diaphragm outwardly, a port opposite the diaphragm for supplying pressure transmitting liquid to the casing, a valve housing carried by the diaphragm and movable therewith, a valve carried by the valve housing for closing the port and disposed in position opening the port when the diaphragm is in its normal position and movable into its port closing position when the diaphragm is moved inwardly under the action of said power means, and a spring carried by the housing and reacting between the diaphragm and valve to project the valve in a direction towards its port closing position and to hold the valve resiliently in its port closing position both when the diaphragm moves towards the port and when the diaphragm moves beyond its port closing position.

11. A pressure creating device including a casing with a diaphragm forming at least part of one wall, means forming an inlet outlined by a valve seat facing the diaphragm, a valve for controlling said inlet, a valve housing carried by the diaphragm and acting on the valve to move the same bodily to and from its seat with the swing of the diaphragm and a spring contained within the housing, movable bodily therewith and reacting between the valve and housing to maintain the valve on its seat when the diaphragm swings towards the seat, and when said diaphragm moves beyond the position where the valve is seated, said diaphragm acts to place the spring under compression.

12. In a device of the class described, the combination of a pressure casing having a port adapted to provide fluid communication with hydraulically actuated mechanism, and having a port for the admission of pressure transmitting liquid, said casing having an outlying wall formed at least in part of a flexible diaphragm, power means engaging the diaphragm to create pressure in the casing, a valve controlling said port and closing the same when pressure is present in the casing, other mechanism normally connected to be actuated by said power means in all operative positions of the power means and unlatching means responsive to pressure in the casing for causing said other mechanism to cease to function while there is pressure in the casing sufficient to maintain said unlatching means in its unlatched position.

13. In a device of the class described, the combination of a pressure creating casing provided with a metallic wall clamped at its outlining edges movable as a whole within its clamped edges, reinforced at its center and flexible between its reinforced center and its clamped edges, and said casing also provided with a port for connecting the casing with hydraulically actuated mechanism, said casing and mechanism being normally filled with liquid power means acting on the wall to move it inwardly and thus create pressure on the liquid in the casing, a retractile spring acting through the power means and normally tending to move the wall outwardly, a reservoir provided with a port for supplying the pressure transmitting liquid to the casing by gravity action to replenish the liquid which may leak therefrom, a valve for controlling said port carried by the movable wall and moved thereby into its valve closing position by an inward movement of the wall under action of the power means and moved into a position opening the port by the action of said retractile spring whereby the liquid is supplied to the casing to maintain the same filled at all times except when the power means is active in closing the valve.

14. In a device of the class described, the combination of a compression casing for supplying pressure to hydraulically actuated mechanism and said casing provided on one side with a diaphragm and with a supply port facing the diaphragm, power means acting on the diaphragm to create pressure in the casing as the diaphragm swings in the direction towards said port, a housing carried by the diaphragm and movable therewith to and from said port with the swing of the diaphragm, a floating valve carried by the housing and having a head projecting from the housing and adapted to close said port when the diaphragm swings inwardly sufficient to locate the valve head in its port closing position, a spring reacting between the housing and valve tending to press the same towards the port, said housing provided with a stop flange through which the valve extends forming means between the housing and valve for limiting the movement of the valve under the action of said spring and said housing acting to withdraw the valve bodily from the port as the diaphragm swings away from the port a distance sufficient to so displace the valve.

15. In a brake system for vehicle with brakes, a single casing having a large diaphragm outlining one side and constituting hydraulic mechanism for applying the brakes, separate mechanical mechanism for applying the brakes, said mechanism being normally interconnected for simultaneous operation, a single control device for said mechanisms, means including mechanism carried by the casing for inactivating the connection between said mechanisms, and means wide open to even slight variation of pressure in said hydraulic mechanism and sensitively responsive to a diminution of pressure therein for causing said inactivating means to function and thus permit said mechanical mechanism to restore its operative connection on a diminution of pressure in the hydraulic mechanism.

16. The combination of a vehicle brake, a foot brake pedal, two chains of power transmitting parts, each capable normally of being activated from the foot pedal for causing the brake to function, one of said chains being entirely mechanical and the other including a fluid pressure transmission system, pressure creating means directly connected to the foot pedal for creating pressure on the liquid in said system, a reservoir normally open to said system for supplying the same with pressure transmitting liquid to maintain the system filled and said liquid in said reservoir being simply under atmospheric pressure and normally free to flow gravitationally into said system, valvular means operatively controlled by the movement of said pressure creating means in its pressure creating action for automatically intercepting any tendency of the liquid to reverse its flow back into the reservoir when subjected to the pressure creating effects of said pressure creating means and means controlled by the presence of fluid pressure in said fluid pressure transmission system for causing said mechanical chain to become functionally inoperative.

17. In a device of the class described, the combination of a pressure creating casing provided with an outlet for conveying pressure to external mechanism and having a metal diaphragm defining one side, a foot lever mounted to turn about a fixed fulcrum and provided with a toothed extension located in its plane of movement, a link connecting the lever with the diaphragm, an arm also mounted to turn about said fulcrum and extending in the same general direction as the lever, a latch plate slidably mounted on the arm and provided with a detent overlapping and normally engaging the toothed extension by gravity action for causing the lever and arm normally to move in unison, a spring engaging the lever and acting through the link to move the diaphragm outwardly of the casing and means controlled by the pressure created in the casing by the inward movement of the diaphragm for elevating the detent free of its engagement with the toothed extension whereby pressure in the casing acts to disconnect the normal connection between said arm and the lever.

18. In a device of the class described, the combination of a pressure casing filled with an actuating liquid and when in operative condition having a port adapted to provide fluid communication with hydraulically actuated mechanism, said casing having outlining walls formed at least in part of two flexible diaphragms, one of larger pressure area than the other, power means engaging the diaphragm of greater area and acting thereon to move the same inwardly to decrease the cubical contents of the casing and thus create pressure therein and in the port, the pressure so created in the casing acting on the diaphragm of smaller area to move the same outwardly and mechanism actuated by said outward movement of the last named diaphragm.

19. In a device of the class described, the combination of a pressure casing filled with an actuating liquid when in operative condition, said casing having an outlining wall provided with an open port, said wall also provided with two openings, pressure creating means closing one of the openings and including an element acting inwardly of the casing to displace some of the liquid therefrom through the port under pressure, and at the same time to create pressure in the liquid remaining in the casing, and means closing the other opening and including an element movable outwardly of the casing in response to the pressure imposed on the liquid therein and mechanism actuated by said outward movement of the last named element.

20. In a device of the class described, the combination of a pressure creating casing having an outlining wall provided with three openings, a diaphragm closing one of the openings and operable inwardly of the casing to create pressure on its contents, a pressure line for actuating a brake and at all times open to another of said openings, power means acting on said diaphragm to swing the same to and from the interior of the casing and on its inward swing to create pressure in said pressure line to actuate the brake, and a second diaphragm closing the other opening and movable outwardly of the casing in response to the pressure created by the inwardly directed movement of the first named diaphragm.

JOHN F. MORAN.